United States Patent
Dudley et al.

[11] Patent Number: 5,081,846
[45] Date of Patent: Jan. 21, 1992

[54] CONTROL OF SPACE HEATING AND WATER HEATING USING VARIABLE SPEED HEAT PUMP

[75] Inventors: Kevin F. Dudley, Cazenovia; Kevin B. Dunshee, Syracuse; Lowell Paige, Penneville, all of N.Y.

[73] Assignee: Carrier Corporation, Syracuse, N.Y.

[21] Appl. No.: 586,130

[22] Filed: Sep. 21, 1990

[51] Int. Cl.⁵ .............................................. F25B 27/00
[52] U.S. Cl. .................................... 62/115; 62/160; 62/238.7
[58] Field of Search .............. 62/115, 160, 181, 238.7

[56] References Cited

U.S. PATENT DOCUMENTS

| | | | |
|---|---|---|---|
| 2,751,761 | 6/1956 | Borgerd | 62/160 X |
| 2,934,913 | 5/1960 | Haines et al. | 62/181 X |
| 4,314,456 | 2/1982 | Harnish | 62/181 |
| 4,364,237 | 12/1982 | Cooper et al. | 62/160 |
| 4,592,206 | 6/1986 | Yamazaki et al. | 62/160 |
| 4,645,908 | 2/1987 | Jones | 62/160 X |
| 4,766,734 | 8/1988 | Dudley | 62/278 X |

Primary Examiner—William E. Tapolcai

[57] ABSTRACT

In an integrated heat pump and water heating system with a variable speed compressor drive, a variable speed indoor fan, and an expansion valve with a variable duty cycle the indoor fan speed is controlled as a function of a space heating load, and the compressor speed is controlled as a function of outdoor temperature and space heating load.

3 Claims, 3 Drawing Sheets

CONTROL OF SPACE HEATING AND WATER HEATING USING VARIABLE SPEED HEAT PUMP

BACKGROUND OF THE INVENTION

This invention relates generally to commercial or residential integrated heat pump systems that provide domestic hot water heating, and comfort heating or cooling of a space, as required, and more particularly to a method and apparatus for delivering hot water heating from a variable speed heat pump system using outdoor air as the heat source while balancing space heating comfort and efficiency.

Heat pumps are often employed to provide heating or cooling, as needed, to a residential or commercial space or comfort zone, i.e., the interior of a home, office, hospital or the like. Heat pumps are also employed to heat water for domestic hot water and commercial use. A heat pump system for comfort zone cooling, comfort zone heating and domestic hot water heating is described in U.S. Pat. No. 4,766,734. Systems of this type can have several modes of operation, such as space cooling simultaneously with water heating, and space heating simultaneously with water heating. Additional modes, such as outdoor coil defrost, can also be employed. Under conditions of space cooling and water heating maximum system efficiency is realized since the heat removed from the space can be simultaneously rejected to the water system for water heating and the outdoor coil. Moreover, for space heating and water heating, supplemental resistive heating elements are also employed as auxiliary heating elements for use at set times when the heat pump alone can not produce sufficient heating for the comfort zone and or hot water. Although U.S. Pat. No. 4,776,734 provides for water heating during periods when space heating is also required, the auxiliary water heating elements are held inactive any time that the heat pump is operating so that the entire heating load of the hot water system is supplied by the heat pump. Typically, the stored water is heated to a temperature of between 120° F. and 140° F. Unfortunately, under conditions of simultaneous space heating and water heating the system efficiency and Coefficient of Performance is degraded since the heat sink temperature for the hot water tank is higher than that of the indoor coil.

Thus, there is a clear need for a method of operating an integrated heat pump and hot water system which delivers simultaneous space heating and water heating from a variable speed heat pump while balancing space comfort and water temperature with system efficiency.

SUMMARY OF THE INVENTION

Accordingly, it is an object of the present invention to provide a method of operating an integrated heat pump and hot water system that controls compressor operation for water heating and space heating so that the compressor and indoor fan are operated at optimum speeds for a variable space load so that the system operates most efficiently.

As a further object of the present invention to provide a controller and logic sequence for managing the operation of a heat pump in the space heating mode and water heating mode so that optimum efficiency can be obtained.

It is another object of the present invention to provide a controller and logic sequence for managing the operation of a refrigerant expansion valve as a function of the outdoor air temperature and the compressor speed to provide the most efficient means for heating a space and heating water.

It is still another object of the present invention to provide a controller and logic sequence for managing the operation of auxiliary electric resistance heaters for both space heating and water heating when compressor heat from the heat pump system is insufficient to provide the required heat load.

These and other objects of the present invention are obtained by means of controller and logic sequence for managing the operation of a heat pump in the combined space heating and water heating mode in which the condenser heat is shared by the space and water loads. In order to meet these simultaneous loads more efficiently, the compressor speed is controlled as a function of the outdoor temperature and the space heating load. Moreover, the distribution of the heat simultaneously for space heating and water heating depends on the indoor fan operation, which is a function of the space heating load, i.e. the higher the space heating load, the higher the indoor fan speed. Thus, the higher the indoor fan speed the more heat is supplied to the space and less to the water. When the space load is low, the indoor fan runs slower and more heat is supplied to the water. To further meet these simultaneous loads most efficiently the duty cycle of the refrigerant expansion valve is controlled as a function of the outdoor air temperature ($T_o$) and the compressor speed ($S_c$). In the embodiment described the duty cycle (D.C.) is calculated according to the relation:

$$DC = A + B(S_c) + C(T_o) + D(S_c)^2 + E(T_o)^2,$$

where A, B, C, and D are predetermined constants.

The control of the duty cycle of the refrigerant expansion valve optimizes refrigerant flow at all conditions to maximize system efficiency.

In order to meet these simultaneous loads more efficiently when the space heating requirement is high and auxiliary electric heat is needed, the indoor fan speed is controlled to provide all of the compressor heat to the space and water heating is done by electric heat, because lower condensing temperatures of the space make this a more efficient use of the compressor heat.

The various features of novelty which characterize the invention are pointed out with particularity. In the claims annexed to and forming a part of the specification. For a better understanding of the invention, its operating advantages, and specific objects obtained by its use, reference should be had to the accompanying drawings and descriptive matter in which there is illustrated and described a preferred embodiment of the invention.

BRIEF DESCRIPTION OF THE DRAWINGS

Other objects and advantages of the present invention will be apparent from the following detailed description in conjunction with the accompanying drawings, forming a part of the specification in which references numerals shown in the drawings designate like or corresponding parts throughout the same, and in which.

DESCRIPTION OF THE PREFERRED EMBODIMENTS

Figure 1:
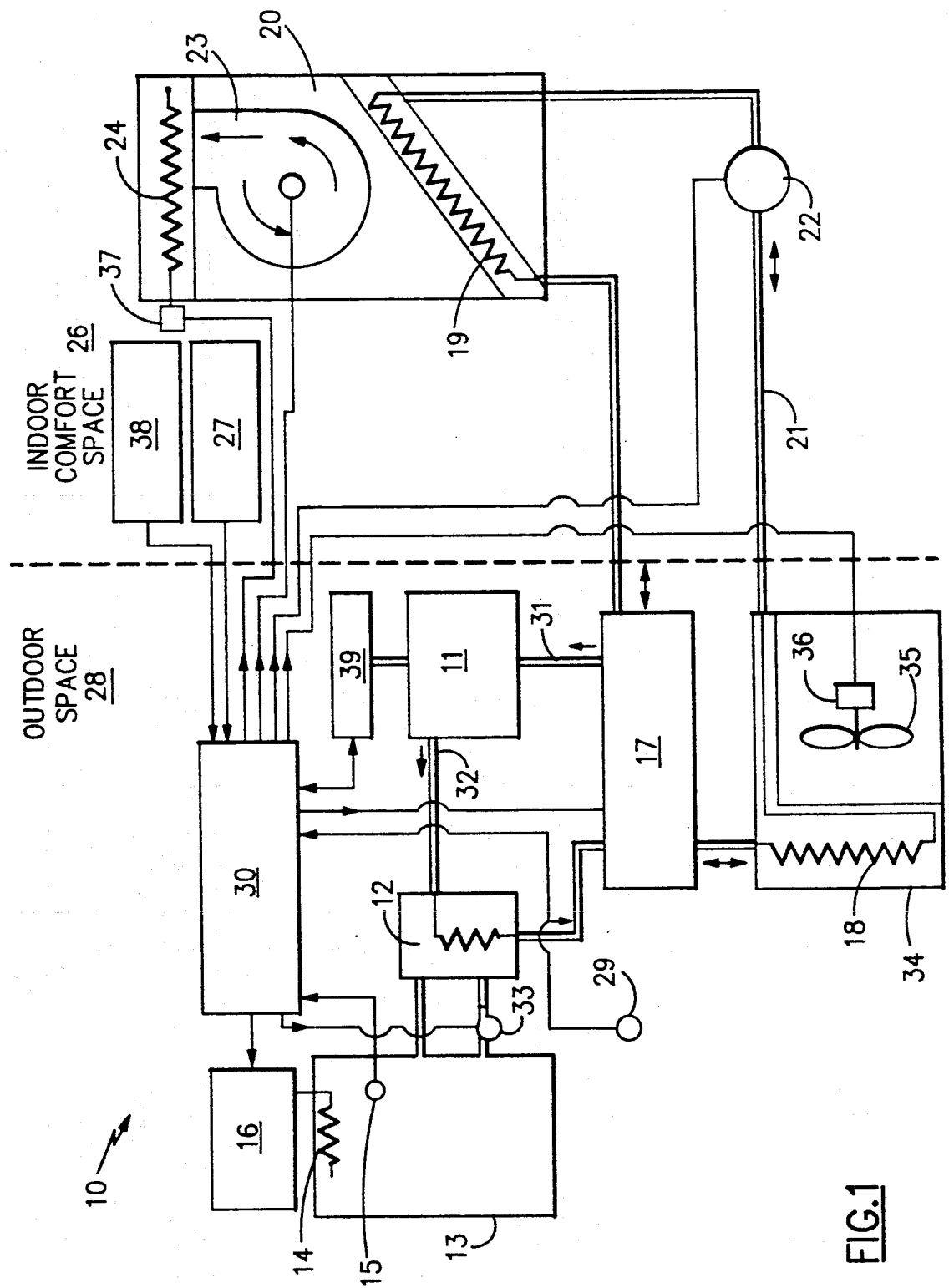
FIG. 1 is a diagrammatic representation of an integrated heat pump and hot water system which operates to the principals of the present invention.

In FIG. 1, an integrated heat pump and hot water system 10 provides conditioned air to an indoor comfort zone, and also provides hot water. In the system 10, the heat pump includes a variable speed compressor 11 capable of pumping refrigerant at a desired temperature and pressure through the heat pump side of the system. The compressor receives a low pressure refrigerant gas through the suction line 31 and discharges high pressure refrigerant gas to a discharge line 32. The compressed refrigerant flows to a refrigerant to water heat exchanger 12 which is coupled through appropriate piping and water pump 33 for heating water in a hot water tank 13. The tank has a well known cold water inlet and hot water outlet (not shown). The tank further has an auxiliary resistive heater 14 and a temperature sensor 15. A water heater relay 16 selectively enables or disables the auxiliary resistive heater 14.

From the refrigerant to water exchanger 12, the compressed refrigerant gas flows to a four-way valve 17 that is coupled through appropriate piping to an outdoor heat exchanger coil 18 located within an outdoor unit 34, or to an indoor heat exchanger coil 19 that is enclosed within an indoor unit 20. The coils 18 and 19 are also coupled to each other by piping 21 in which there is located a bi-flow refrigerant expansion valve 22 of the electronically controlled pulse solenoid type. Within the outdoor unit 34 is a fan driven by motor. Also, within the indoor unit 20 is a variable speed motor driven fan 23, and an auxiliary resistive heater 24 on the discharge side of the fan 23. A space heater relay 37 selectively enables or disables the auxiliary resistive heater element 24. The indoor unit 20 is located within an indoor comfort space 26, e.g., a home or office along with a space thermostat 27 and, a water thermostat 38. Water heating load is determined by controller 30 as a function of water tank 13 temperature and a user setpoint set at the water thermostat 38. When the water temperature drops a predetermined amount below the setpoint then water heating is commenced. The outdoor unit 34 is located in an outdoor space 28 in which an outdoor air temperature sensor 29 is also located.

A controller 30 is formed of a microprocessor having a memory storage capability and which is programmable to send control signals to the compressor variable speed, the variable speed indoor fan 23, the indoor drive 39 heater relay 37, the variable speed outdoor 35, the water heater relay 16, the water pump 33, the refrigerant expansion valve 22, and the four-way valve 17. The controller also has inputs for receiving electric signals from the water heater temperature sensor 15, the outdoor air temperature sensor 29, the compressor variable speed drive 39, the indoor fan, the water thermostat and the space thermostat 27. The four-way valve 17 can assume heating or cooling configurations in the integrated system 10 by establishing a sequence in response to the space thermostat 27 in which the refrigerant flows through the two coils 18 and 19. In normal operation for cooling of the comfort space 26, the four-way 17 valve furnishes the compressed refrigerant gas first to the outdoor heat exchanger coil 18, which serves a condenser, and then through the piping 21 and expansion valve 22 to the indoor heat exchanger coil 19. Then the low pressure refrigerant gas from the indoor heat exchanger coil 19 is supplied again through the four-way valve 17 to the suction line 31 of the compressor and out the discharge line 32 to the refrigerant to water heat exchanger 12, which also acts as a condenser, and back to the four-way valve 17.

For the heating mode of the preferred embodiment of the present invention, the compressed refrigerant gas discharged from the variable speed compressor 11 flows first to the refrigerant through water heat exchanger 12, which serves a condenser, and then through the four-way valve 17, which has been sequenced for heating, to the indoor heat exchanger coil 19, which also serves as a condenser. Condensed refrigerant liquid then flows through the expansion valve 22 and piping 21 into the outdoor heat exchanger coil 18 which serves as an evaporator. The low pressure gases then return through the four-way valve 17 to the suction line 31 of the variable speed compressor 11.

Figure 2:
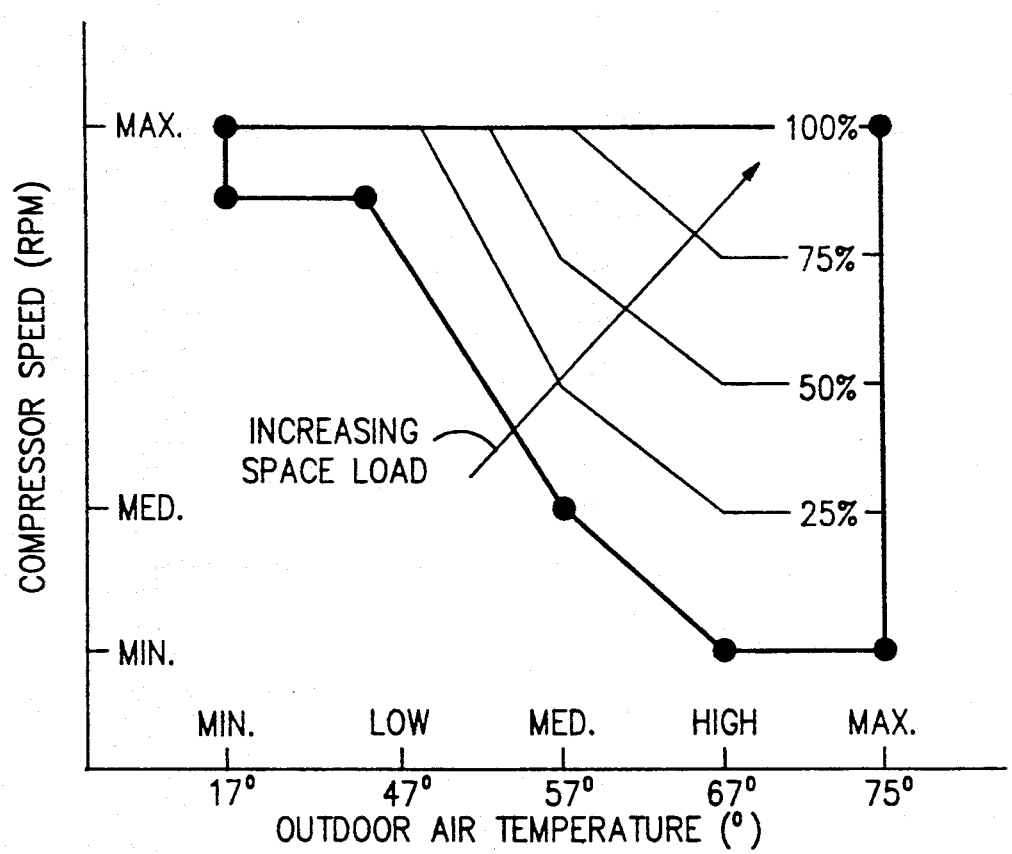
FIG. 2 is a chart showing the relation of compressor speed, outdoor air temperature and space load in a predetermined performance envelope for explaining the operating principles of the present invention.

Compressor speed in the simultaneous space heating and water heating mode is generally regulated as shown in FIG. 2. In the combined space heating and water heating mode the condenser heat is shared by the space and water loads. In order to meet these simultaneous loads the compressor speed is a function of outdoor air temperature ($T_o$) and the space heating load. The controller 30 adjusts compressor speed operation to conditions wherein both outdoor air temperature and space heating load are within a performance envelope bounded by a minimum and maximum outdoor air temperatures and minimum and maximum space load. Operation within the boundaries of the envelope produces optimum compressor speed operation. Within the efficiency envelope there is a family of curves relating to space load (increasing from left to right) as a percentage of the design load of a given system. The space heating load, the difference between a desired space temperature and actual space temperature, is calculated by the thermostat 27 which sends a corresponding signal to the controller 30. The controller 30 has an output connected to the compressor variable speed drive 39 which is operatively connected to the compressor 11. The variable speed drive 39 may be any known device, e.g. an AC motor driven by an inverter.

Figure 3:
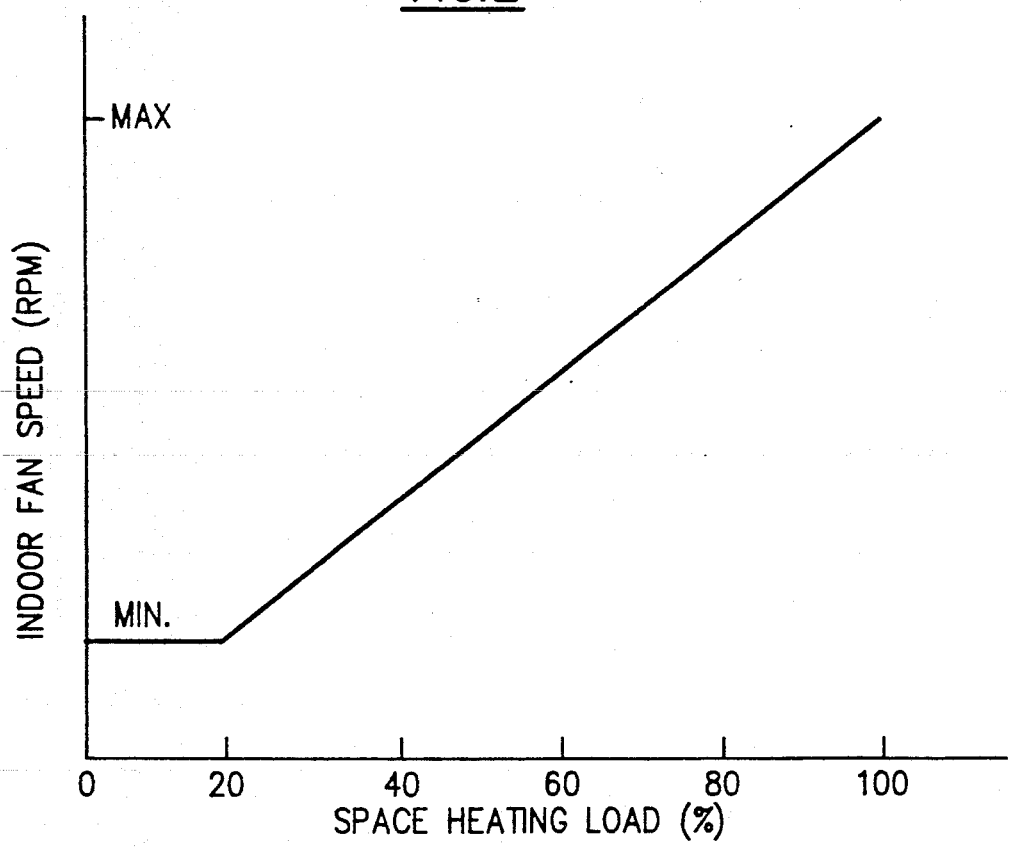
FIG. 3 is a chart showing the relation of indoor fan speed to space heating load for explaining the operating principles of the present invention.

The distribution of heat from the system 10 depends on the speed of variable speed motor driven fan 23, which is a function of the space heating load as shown in FIG. 3. As the heating load increases the speed of the variable speed motor driven fan 23 also increases. Accordingly, the faster the variable speed motor driven fan operates the more heat is supplied to the space and the less heat is supplied to the hot water tank 13 through the refrigerant to water heat exchanger 12.

Figure 4:
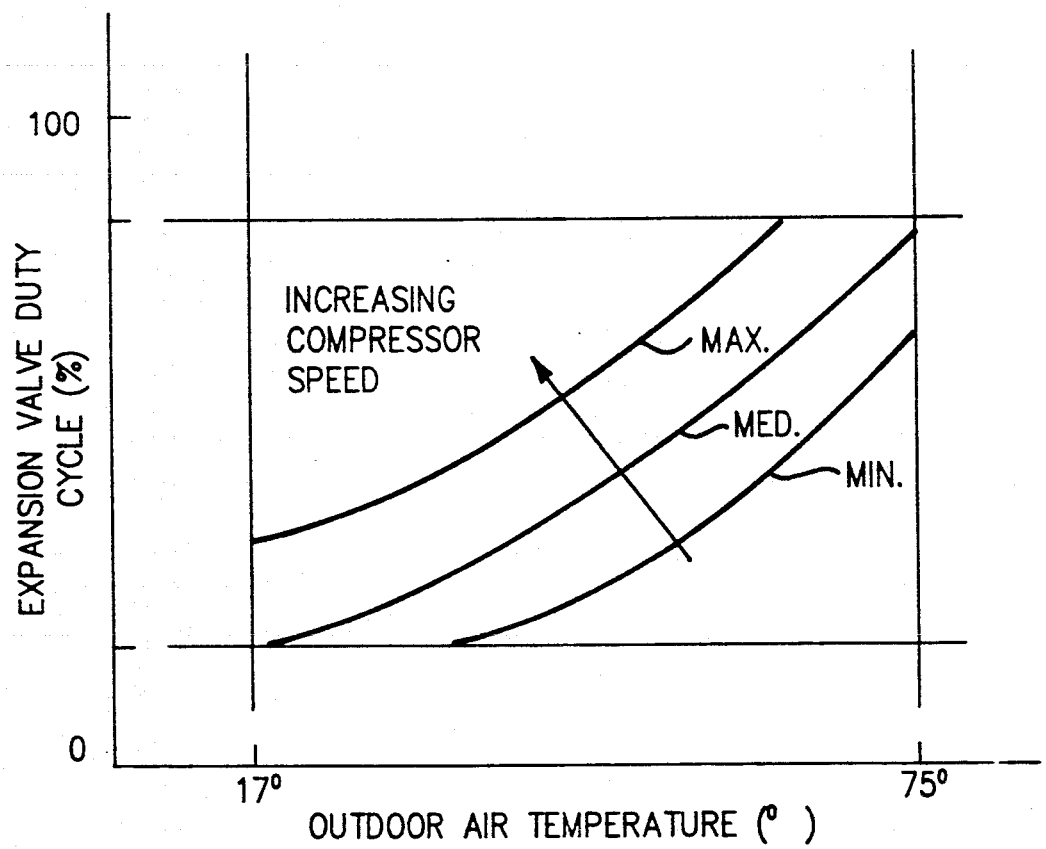
FIG. 4 is a chart shown the relation of expansion valve duty cycle, outdoor air temperature, and compressor speed for explaining the operating principles of the present invention.

The duty cycle of expansion valve 22 is generally regulated as shown in FIG. 4. The expansion valve duty cycle is a function of both outdoor air temperature ($T_o$) and the speed of the compressor ($S_c$). The controller 30, having received an input signal from the outdoor air temperature sensor 29 and a speed signal from the compressor variable speed drive 40 regulates the expansion valve duty cycle to a predetermined percentage of the duty cycle. In the embodiment described, the duty cycle is calculated according to the relation;

$$DC = A + B(S_c) + C(T_o) + D(S_c)^2 + E(T_o)^2$$

Accordingly, the calculated duty cycle optimizes refrigerant flow in the system 10 at all conditions to maximize system efficiency.

In accordance with the present invention, during normal operation the auxiliary resistive heater 14 is generally de-energized by the water heater relay 16. This generally allows the heat pump system 10 to provide most of the heating for the hot water tank 13 at high efficiencies. The auxiliary resistive heater 14 is only energized when the heat pump system can not keep up with the water heating load and the space load. If the space heating requirement is high and water heating is simultaneously required, the compressor heat is first provided to the space and water heating may be provided solely by the auxiliary resistive heaters 14. Priority is given to space heating in this embodiment because lower condensing temperatures make this embodiment a more efficient use of the compressor heat. However, auxiliary resistive heater 24 may also be required when the space load is greater than the heat capable of being supplied by the compressor at maximum speed.

While a preferred embodiment of the present invention has been depicted and described, it would be appreciated by those skilled in the art that many modifications, substitutions and changes may be made thereto without the parting from the true spirit and scope of the invention. For example, although the invention has been described in terms of separate refrigerant to water heat exchanger and hot water tank, these may be combined into a single device.

What is claimed is:

1. In an integrated heating system for simultaneously heating a space and hot water including a compressor with a variable speed drive for compressing a heat transfer fluid, the compressor having a suction port and a discharge port, a water heat exchanger and indoor heat exchanger operatively connected in serial arrangement to the discharge port of the compressor, an outdoor heat exchanger operatively connected to the suction port of the compressor, and expansion device operatively connected to the indoor and outdoor heat exchangers, the indoor and outdoor heat exchangers each having a variable speed fan associated therewith for moving air over each heat exchanger for transferring heat to and from the heat exchangers, a thermostat device for presetting a desired space temperature and comparing the desired space temperature to the actual space temperature for determining a space heating load, and a controller having outputs for controlling the speed of the compressor variable speed drive and the indoor variable speed fan, and inputs for receiving signals from the thermostat device for the space heating load, from the indoor variable speed fan for the speed of the indoor fan, and from an outdoor air temperature sensor for the outdoor air temperature, a method of operating the heating system comprising the steps of:

sensing the space heating load for the space to be heated;

controlling the speed of the variable speed indoor fan in response to the space heating load;

sensing the outdoor temperature;

comparing said outdoor temperature with said space heating load;

controlling the speed of the compressor variable speed drive as a predetermined function of said outdoor temperature and said space heating load; and limiting the operation of the the expansion valve as a predetermined function of said outdoor temperature and the speed of the compressor variable speed drive.

2. The method as set forth in claim 1 wherein said predetermined function for limiting the operation of the expansion valve employs the relationship $DC + A + B(S_c) + C(T_o) + D(S_c) + E(T_o)^2$ wherein; DC indicates the duty cycle operation of the expansion valve; A, B, C, D, and E indicate heating mode operational constants; $S_c$ indicates compressor speed; and $T_o$ indicates outdoor temperature.

3. In an integrated heating system as set forth in claim 2 further including a first auxiliary electric heater for heating the hot water and a second auxiliary heater for heating the space, the method further including the step of energizing the first auxiliary electric heater when the speed of the compressor variable speed drive is unable to satisfy the space heating load and hot water heating simultaneously.

* * * * *